US010674174B2

(12) United States Patent
Omori et al.

(10) Patent No.: US 10,674,174 B2
(45) Date of Patent: Jun. 2, 2020

(54) CODING APPARATUS, CODING METHOD, AND RECORDING MEDIUM (71) Applicant: CANON KABUSHIKI KAISHA, Tokyo (JP)

(72) Inventors: Yuji Omori, Kawasaki (JP); Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/134,430

(22) Filed: Sep. 18, 2018

(65) Prior Publication Data

US 2019/0098330 A1 Mar. 28, 2019

(30) Foreign Application Priority Data

Sep. 22, 2017 (JP) ................................. 2017-182454

(51) Int. Cl.
*H04N 19/61* (2014.01)
*H04N 19/182* (2014.01)
*H04N 19/176* (2014.01)
*H04N 19/137* (2014.01)
*H04N 19/52* (2014.01)
*H04N 19/105* (2014.01)
*H04N 19/436* (2014.01)
*H04N 19/523* (2014.01)
*H04N 19/51* (2014.01)

(52) U.S. Cl.
CPC ........... *H04N 19/51* (2014.11); *H04N 19/105* (2014.11); *H04N 19/137* (2014.11); *H04N 19/176* (2014.11); *H04N 19/182* (2014.11); *H04N 19/436* (2014.11); *H04N 19/52* (2014.11); *H04N 19/523* (2014.11)

(58) Field of Classification Search
None
See application file for complete search history.

(56) References Cited

U.S. PATENT DOCUMENTS

2004/0223548 A1* 11/2004 Kato .................... H04N 19/172
375/240.16
2005/0152452 A1* 7/2005 Suzuki ................. H04N 19/176
375/240.16

(Continued)

FOREIGN PATENT DOCUMENTS

JP 8-126012 A 5/1996

*Primary Examiner* — Reza Aghevli
(74) *Attorney, Agent, or Firm* — Canon U.S.A., Inc. IP Division (57) ABSTRACT A coding apparatus for coding a frame of a moving image on a block basis includes a calculation unit configured to, for a block adjoining the target block and having a motion vector to be used for coding having been selected, from among blocks in the frame, calculate a difference between a detected motion vector and a motion vector of the target block and calculate a difference between pixels of a reference block identified by applying a motion vector of the adjoining block to the target block and pixels of the target block, a determination unit configured to determine whether a motion vector to be used for coding the adjoining block has been detected at the time of processing, and a motion vector selection unit configured to, based on a calculation result and a determination result, select a motion vector to be used for coding the target block.

13 Claims, 7 Drawing Sheets (56) References Cited

U.S. PATENT DOCUMENTS

| | | | | |
|---|---|---|---|---|
| 2007/0025442 A1* | 2/2007 | Okada | H04N 19/52 | 375/240.03 |
| 2007/0025444 A1* | 2/2007 | Okada | H04N 19/52 | 375/240.16 |
| 2007/0064809 A1* | 3/2007 | Watanabe | H04N 19/159 | 375/240.16 |
| 2009/0268819 A1* | 10/2009 | Nishida | H04N 19/56 | 375/240.16 |
| 2010/0026903 A1* | 2/2010 | Tetsukawa | H04N 19/52 | 348/699 |
| 2010/0111185 A1* | 5/2010 | Yokoyama | H04N 19/61 | 375/240.16 |
| 2010/0226436 A1* | 9/2010 | Dane | H04N 19/139 | 375/240.16 |
| 2013/0028531 A1* | 1/2013 | Sato | H04N 19/82 | 382/233 |
| 2016/0073111 A1* | 3/2016 | Lee | H04N 19/124 | 375/240.03 |
| 2017/0070745 A1* | 3/2017 | Lee | H04N 19/513 | |

\* cited by examiner

| | t1 | t2 | t3 | t4 | t5 |
|---|---|---|---|---|---|
| A | DETECT INTEGRAL PRECISION MOTION OF A & SELECT MOTION VECTOR OF A | CALCULATE DECIMAL PRECISION MOTION VECTOR OF A | PERFORM CODING OF A | | |
| B | | DETECT INTEGRAL PRECISION MOTION OF B & SELECT MOTION VECTOR OF B | CALCULATE DECIMAL PRECISION MOTION VECTOR OF B | PERFORM CODING OF B | |
| C | | | DETECT INTEGRAL PRECISION MOTION OF C & SELECT MOTION VECTOR OF C | CALCULATE DECIMAL PRECISION MOTION VECTOR OF C | PERFORM CODING OF C |

CODING APPARATUS, CODING METHOD, AND RECORDING MEDIUM

BACKGROUND OF THE INVENTION

Field of the Invention

The present invention relates to a coding apparatus for performing coding based on motion vectors of frames included in a moving image.

Description of the Related Art

H.26x, Moving Picture Experts Group (MPEG), High Efficiency Video Coding (HEVC), etc. are conventionally known as coding methods. In these coding methods, one frame is divided into a plurality of blocks, and coding is performed on a block basis. There are two different compressing and encoding methods: a coding method using temporal correlation (inter-coding) and a coding method using spatial correlation (intra-coding). The coding method using temporal correlation searches for a motion between frames and obtains motion vectors of blocks in frames and difference values between blocks to perform cording. In HEVC inter-coding, a coding mode called a merge mode has been introduced. When the motion vector of a coding target block is the same as the motion vector of a neighbor block, coding is performed in the merge mode. In the merge mode, the amount of code can be restricted without coding the motion vector of a target block. When the merge mode is used and the pixel difference from an adjoining block is 0, a skip mode is selected. Japanese Patent Application Laid-Open No. 8-126012 discusses a technique of changing a result of motion search to increase the ratio of skip mode selection in order to reduce the amount of code.

However, under the influence of sensor noise, a minute motion vector may be incorrectly detected in a block which is not actually moving. In this case, neither the merge mode nor the skip mode is selectable for a block which needs to be coded in either mode. As described above, there has been an issue of reduction in coding efficiency in a non-flat image having a high noise condition. In a certain circuit configuration for coding through pipeline processing for each block, the motion vector of the adjoining block to the left of a target block (hereinafter referred to as a left adjoining block) has not been determined at the time of motion search for the target block. For this reason, there has been an issue that whether the merge mode is selected cannot be determined by using the motion vector of the left adjoining block since the motion vector of the left adjoining block has not been determined at the time of motion search for the target block.

SUMMARY OF THE INVENTION

The present disclosure is directed to performing suitable coding at a lower calculation cost.

According to an aspect of the present disclosure, a coding apparatus for coding a frame of a moving image on a block basis includes a detection unit configured to detect a motion vector of each block of the frame, a calculation unit configured to, for a block adjoining a process target block and having a motion vector to be used for coding having been selected, from among blocks in the frame, calculate a difference value between the motion vector detected by the detection unit and the motion vector of the target block and calculate a difference value between pixels of a reference block identified by applying the motion vector of the adjoining block to the target block and pixels of the target block, a determination unit configured to determine whether the motion vector to be used for coding the adjoining block has been detected at the time of processing, and a motion vector selection unit configured to, based on a calculation result by the calculation unit and a determination result by the determination unit, select a motion vector to be used for coding the target block, from among the motion vector detected from the target block and the motion vector to be used for coding the adjoining block.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings.

Figure 1:
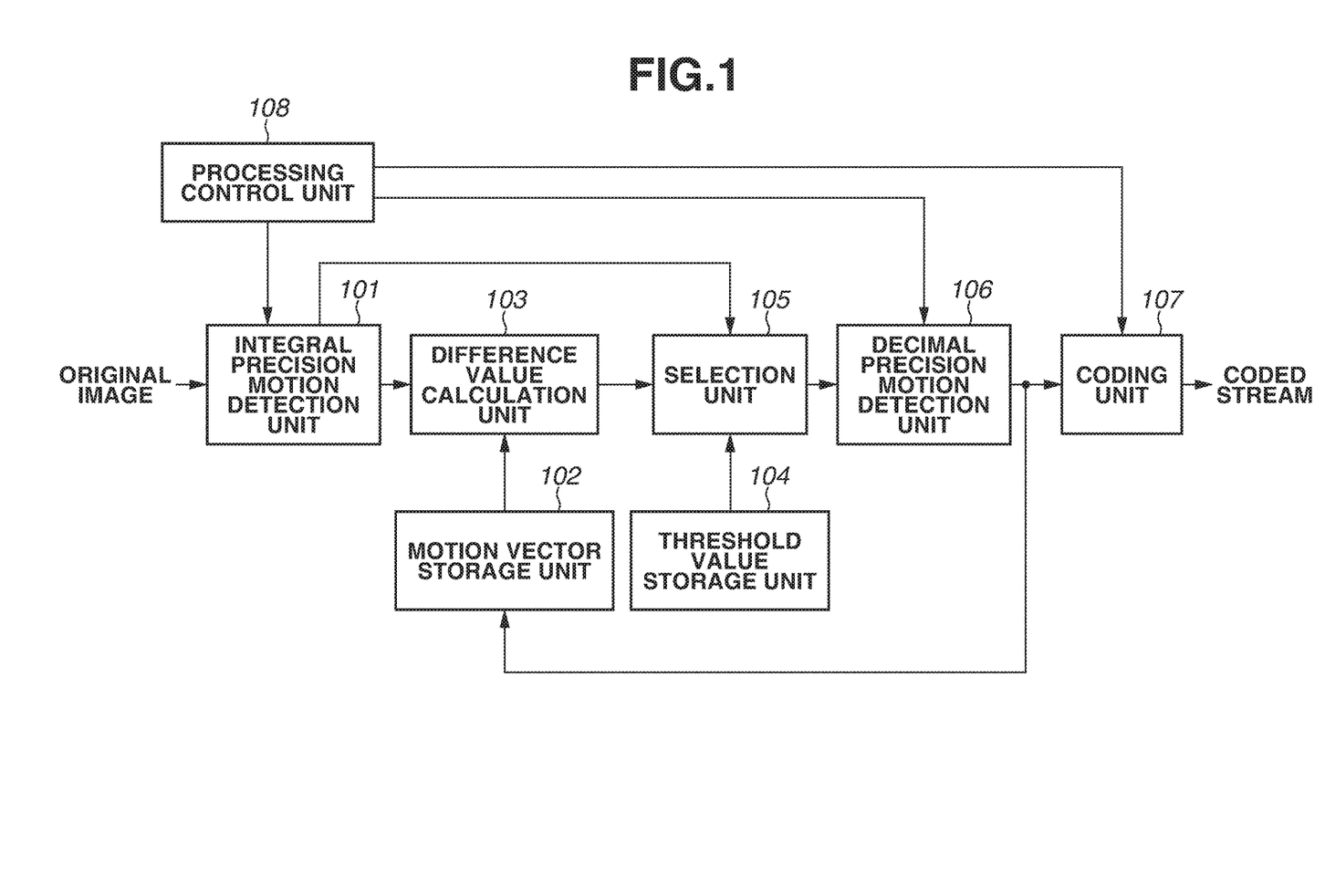
FIG. 1 illustrates a coding apparatus according to a first exemplary embodiment.

FIG. 1 illustrates a coding apparatus 100 according to a first exemplary embodiment. The coding apparatus 100 divides each frame in a moving image into a plurality of blocks and performs coding on a block basis. The coding apparatus 100 further sequentially selects each of a plurality of blocks in one frame as a process target block and performs coding of the selected block. The coding apparatus 100 repeats the sequence for all blocks to complete coding of the entire frame.

Figure 2:
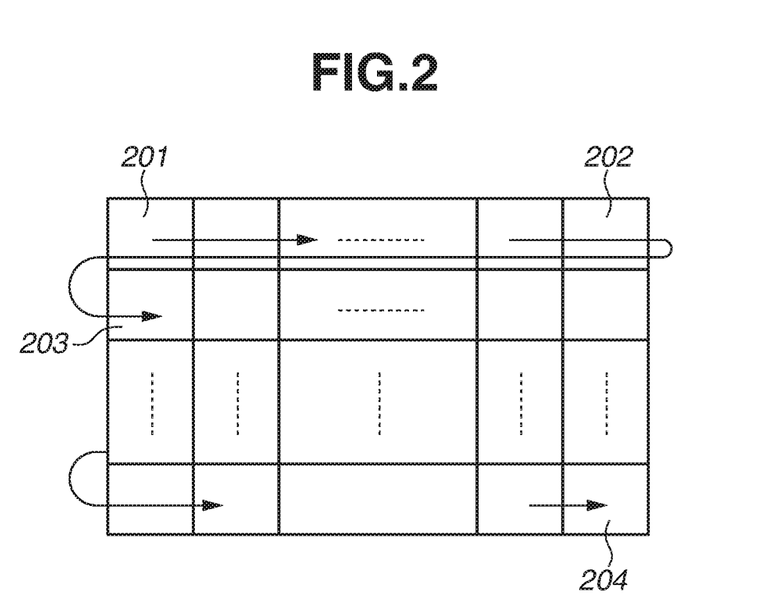
FIG. 2 illustrates the order of processing blocks in a frame.

FIG. 2 illustrates the order of processing blocks in a target frame to be processed by the coding apparatus 100. According to the present exemplary embodiment, the coding apparatus 100 first selects a block 201 at the upper left position of the frame as a process target and then sequentially selects each of blocks rightwardly arranged, as a process target. When a right end block 202 is reached, the coding apparatus 100 subsequently selects a block 203 at the left end of the following row as a process target. When the coding apparatus 100 has selected a bottom right block 204 in this way, coding of one frame is completed. The coding apparatus 100 performs coding through pipeline processing for each block (pipeline processing will be described below).

As illustrated in FIG. 1, the coding apparatus 100 includes an integral precision motion detection unit 101, a motion vector storage unit 102, a difference value calculation unit 103, a threshold value storage unit 104, a selection unit 105, a decimal precision motion detection unit 106, a coding unit 107, and a processing control unit 108. A block to be subjected to coding is referred to as a target block. The integral precision motion detection unit 101 performs integral precision motion detection on the target block to detect an integral precision motion vector. The motion vector storage unit 102 stores the decimal precision motion vector detected by the decimal precision motion detection unit 106.

The difference value calculation unit 103 calculates the difference value between the integral precision motion vector of the target block and the integral precision motion vector of a block adjoining the target block. An adjoining block refers to a block adjoining the target block and having already been selected as a process target before the target block. When the difference value calculation unit 103 processes the target block, the integral precision motion vector of the left adjoining block has been detected. Therefore, the left adjoining block can also be selected as a target of the difference value calculation. More specifically, the difference value calculation unit 103 calculates the sum of the absolute value of the horizontal difference value and the absolute value of the vertical difference value as a motion vector difference value. The method of calculating the motion vector difference value is not limited to that according to the exemplary embodiment. As another example, the difference value calculation unit 103 may calculate the sum of the square of the horizontal difference value and the square of the vertical difference value as a motion vector difference value. As another example, the difference value calculation unit 103 may calculate the square root of the sum of the square of the horizontal difference value and the square of the vertical difference value as the motion vector difference value. The difference value calculation unit 103 further identifies a reference block when the motion vector of the target block is replaced with the integral precision motion vector of the left adjoining block. Then, the difference value calculation unit 103 calculates the pixel difference value between the reference block and the target block.

The threshold value storage unit 104 stores a threshold value for comparison with the difference value calculated by the difference value calculation unit 103. The threshold value storage unit 104 stores a vector threshold value corresponding to the motion vector difference value, and a pixel threshold value corresponding to the pixel difference value. The selection unit 105 compares the motion vector difference value and the pixel difference value calculated by the difference value calculation unit 103 with the vector threshold value and the pixel threshold value, respectively. These threshold values may be changeable through a user operation or a specification from an external apparatus. According to the comparison result, the selection unit 105 selects a motion vector to be used for coding the target block from among the motion vectors of the target block and the adjoining block. The adjoining block as a candidate of the motion vector of the target block is a block selected as a coding process target before the target block out of adjoining blocks of the target block. In descriptions of the present exemplary embodiment, a block which adjoins the target block and is selected before the target block is referred to as an adjoining block.

According to the processing result by the selection unit 105, the decimal precision motion detection unit 106 suitably performs decimal precision motion detection on the target block to detect the decimal precision motion vector of the target block. The decimal precision motion vector detected by the decimal precision motion detection unit 106 is stored in the motion vector storage unit 102 in association with identification information of the detection source block. According to the present exemplary embodiment, only when the motion vector of the target block is selected by the selection unit 105, the decimal precision motion detection unit 106 detects the decimal precision motion vector of the target block. On the other hand, when an adjoining block is selected by the selection unit 105, the decimal precision motion detection unit 106 does not detect the decimal precision motion vector. As another example, the decimal precision motion detection unit 106 may constantly detect the decimal precision motion vector of the target block when an adjoining block is selected by the selection unit 105. The coding unit 107 generates a coded stream by using the motion vector selected for the target block.

The coding apparatus 100 according to the present exemplary embodiment performs coding through pipeline processing for each block. The coding apparatus 100 performs pipeline processing in the following three steps. The first step includes the integral precision motion vector detection by the integral precision motion detection unit 101, the difference value calculation by the difference value calculation unit 103, and the motion vector selection by the selection unit 105. The second step includes the decimal precision motion vector detection by the decimal precision motion detection unit 106. The third step includes the coding by the coding unit 107. The processing control unit 108 controls processing timing of each unit in pipeline processing.

Figure 3:
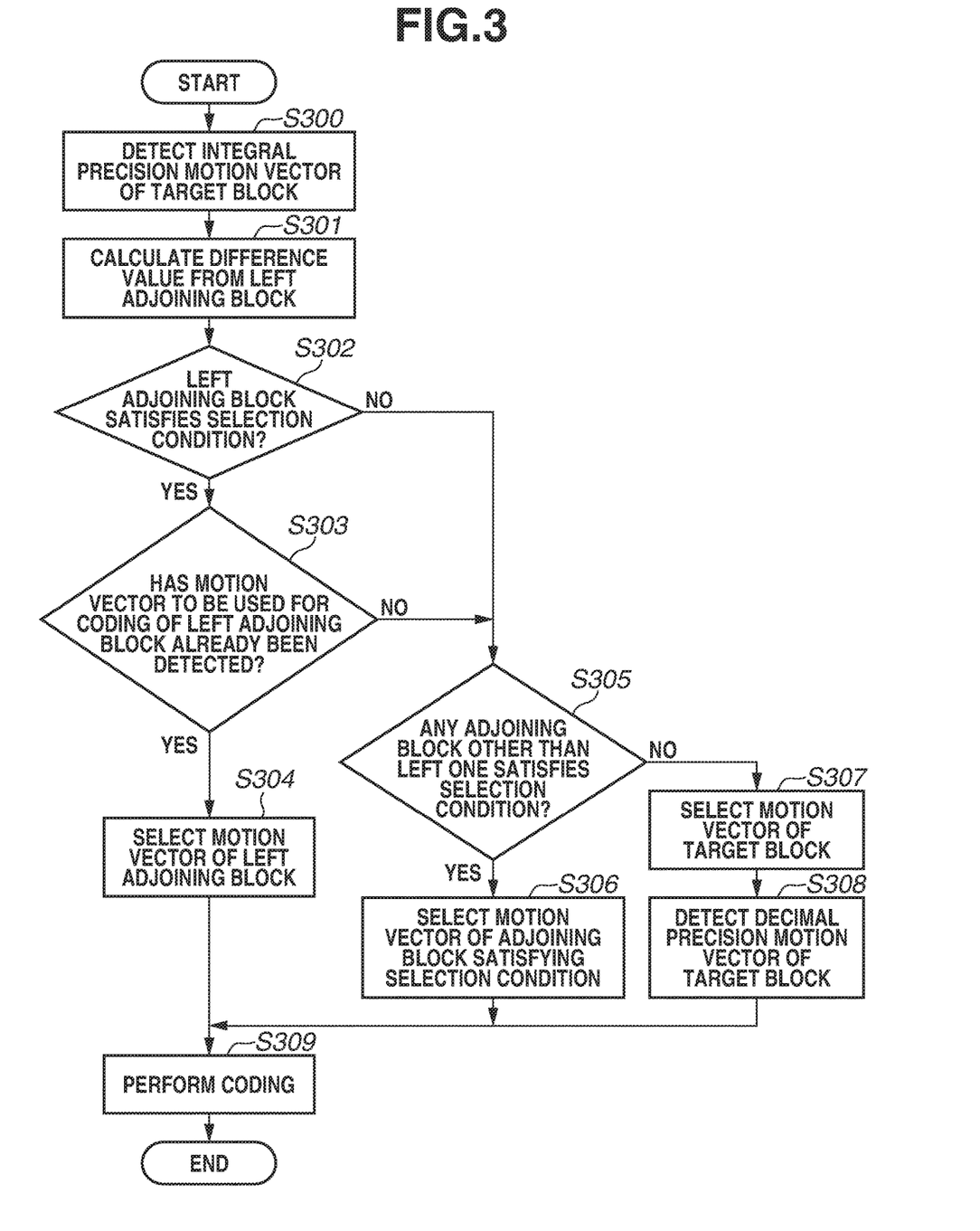
FIG. 3 is a flowchart illustrating a coding process.
Figure 4:
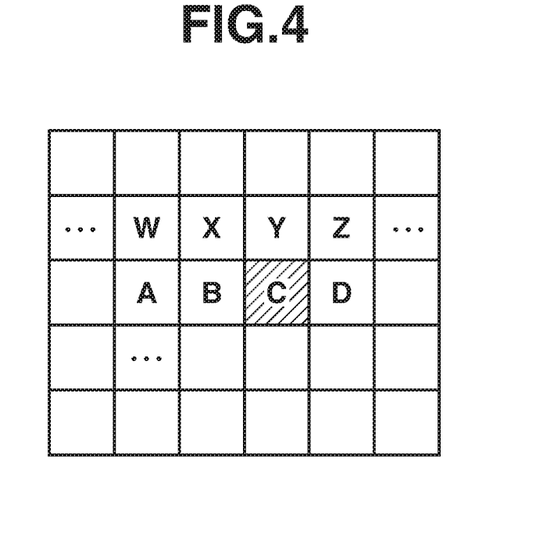
FIG. 4 illustrates blocks in a process target frame.

FIG. 3 is a flowchart illustrating a coding process by the coding apparatus 100. FIG. 4 illustrates each block in a process target frame. Four adjoining blocks in a certain row (block line) include a block A, block B, block C, and block D in order of processing, and four adjoining blocks in the preceding row corresponding to the blocks A, B, C, and D include a block W, block X, block Y, and block Z, respectively. The coding process will be described below based on an example case where the block C in FIG. 4 is selected as a process target.

Referring to FIG. 3, in step S300, the integral precision motion detection unit 101 detects the integral precision motion vector of the target block. In step S301, the difference value calculation unit 103 calculates the difference value between the integral precision motion vector of the target block and the integral precision motion vector of the left adjoining block. The difference value calculation unit 103 also identifies a reference block by applying the integral precision motion vector of the left adjoining block to the target block and calculates the pixel difference value between the reference block and the target block. The processing is an example of calculation processing. Referring to the example illustrated in FIG. 4, the block C is a target block and the block B is the left adjoining block.

In step S302, the selection unit 105 determines whether the left adjoining block satisfies the selection condition, based on the two different difference values calculated in step S301. The selection condition is a condition for determining whether the motion vector of the left adjoining block is selectable as a motion vector of the target block, based on the two different difference values calculated for the left adjoining block. The selection condition is a preset condition. According to the present exemplary embodiment, a condition that the motion vector difference value is less than the vector threshold value and the pixel difference value is less than the pixel threshold value is set as the selection condition.

When the left adjoining block satisfies the selection condition (YES in step S302), the selection unit 105 selects the motion vector of the left adjoining block as a candidate of the motion vector to be used for coding the target block. Then, the processing proceeds to step S303. On the other hand, when the left adjoining block does not satisfy the selection condition (NO in step S302), the processing proceeds to step S305. Cases where the left adjoining block does not satisfy the selection condition include a case where the motion vector difference value is equal to or larger than the vector threshold value and a case where the pixel difference value is equal to or larger than the pixel threshold value.

In step S303, the selection unit 105 determines whether the motion vector to be used for coding the left adjoining block has been detected at the time of the processing in step S303. The processing will be described below with reference to FIG. 5. When the selection unit 105 determines that the motion vector to be used for coding the left adjoining block has been detected (YES in step S303), the processing proceeds to step S304. On the other hand, when the selection unit 105 does not determine that the motion vector to be used for coding the left adjoining block has been detected (NO in step S303), the processing proceeds to step S305. Examples of cases where the motion vector has not been detected include a case where the integral precision motion vector has been detected but the decimal precision motion vector has not been detected. In step S304, the selection unit 105 selects the motion vector to be used for coding the left adjoining block as a motion vector to be used for coding the target block. Then, the processing proceeds to step S309.

In step S305, the selection unit 105 considers adjoining blocks other than the left adjoining block as process targets. When the block C in FIG. 4 is the target block, the blocks X, Y, and Z are selected as process target adjoining blocks. Then, the selection unit 105 determines whether the motion vector of any one of the process target adjoining blocks is selectable as a motion vector to be used for coding the target block. More specifically, the selection unit 105 calculates the difference value between the motion vector to be used for coding each of the process target adjoining blocks and the motion vector of the target block. The selection unit 105 further identifies a reference block by applying the motion vector to be used for coding each of the adjoining blocks to the target block and calculates the pixel difference value between the reference block and the target block. The motion vector to be used for coding each adjoining block in this case is the decimal precision motion vector. Similar to the processing in step S302, the selection unit 105 determines whether there is an adjoining block with which the two different difference values satisfy the selection condition. When there is an adjoining block satisfying the selection condition (YES in step S305), the processing proceeds to step S306.

In step S306, the selection unit 105 selects the motion vector to be used for coding the adjoining block satisfying the selection condition as a motion vector to be used for coding the target block. Then, the processing proceeds to step S309. When a plurality of adjoining blocks satisfies the selection condition, the selection unit 105 preferentially selects the motion vector of the adjoining block having higher priority. Priority is preset in the coding apparatus 100 according to the positional relation with the target block. For example, priority is set such that the upper right, upper, and upper left blocks for the target block are preferentially selected in this order. Priority needs to be defined according to the positional relation with the target block, but the specific condition is not limited to that according to the exemplary embodiment.

The selection unit 105 needs to select one adjoining block satisfying the selection condition from among a plurality of process target adjoining blocks in steps S305 and S306, but specific processing for the selection is not limited to that according to the exemplary embodiment. As another example, the selection unit 105 may sequentially select each of process target adjoining blocks in order of priority and examine whether the selected adjoining block satisfies the selection condition. Then, if the selected adjoining block does not satisfy the selection condition, the selection unit 105 may select the next adjoining block and repeat processing in this way until the selected adjoining block satisfies the selection condition.

On the other hand, when there is no process target adjoining block satisfying the selection condition (NO in step S305), the processing proceeds to step S307. In step S307, the selection unit 105 selects the motion vector detected from the target block as a motion vector to be used for coding the target block. In step S308, the decimal precision motion detection unit 106 detects the decimal precision motion vector of the target block. Then, the processing proceeds to step S309. The processing in steps S304, S306, and S308 is an example of vector selection processing. In step S309, the coding unit 107 performs coding of the target block by using the motion vector selected for the target block. This completes the coding process by the coding apparatus 100. As described above, the coding apparatus 100 according to the present exemplary embodiment determines the motion vector to be used for coding the target block based on the result of calculating the difference value for the left adjoining block and the result of determining whether the motion vector to be used for coding the left adjoining block has been detected.

Figure 5:
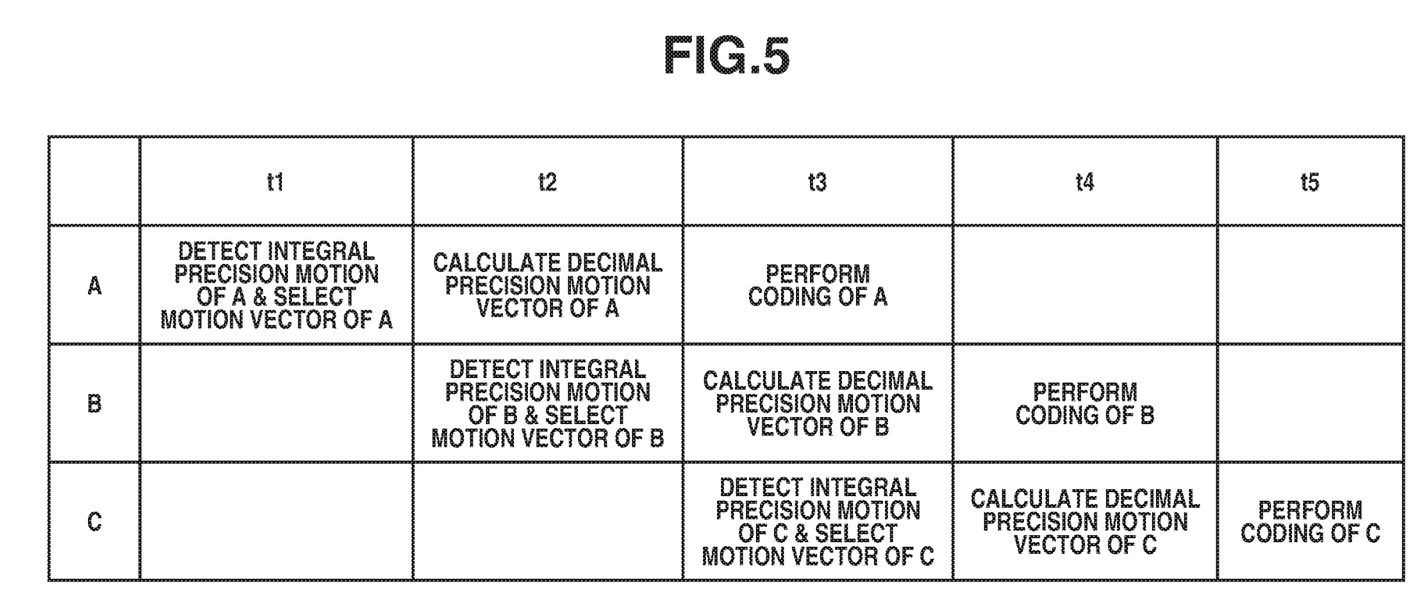
FIG. 5 schematically illustrates pipeline processing.

FIG. 5 schematically illustrates the pipeline processing in the coding process. As illustrated in FIG. 5, when the coding process for the block A starts in a time period t1, the coding process for the block B starts in a time period t2, and the coding process for the block C starts in a time period t3. The following describes a case where the coding process in FIG. 3 is performed with the block C set as the target block. During the time period t3, the integral precision motion detection unit 101 detects the integral precision motion vector of the block C, and the selection unit 105 selects the motion vector. During the time period t3, the decimal precision motion detection unit 106 has not detected the decimal precision motion vector of the block B as the left adjoining block. Then, the coding apparatus 100 according to the present exemplary embodiment calculates the difference value between the left adjoining block and the target block by using the integral precision motion vector already detected during the time period t3. This makes it possible, before the decimal precision motion vector detection, to determine whether to select the motion vector of the left adjoining block as a candidate of the motion vector to be used for coding the target block.

In step S302, according to the result of calculating the difference value, there are a case where the motion vector of the block C is selected as a motion vector to be used for coding the block C and a case where the motion vector of the block B is selected as a candidate of the motion vector to be used for coding the block C. In steps S307 and S308, when the motion vector of the block C is selected, the decimal precision motion detection unit 106 detects the decimal precision motion vector of the target block (block C) in a time period t4.

The following describes a case where the motion vector of the block B is selected as a candidate of the motion vector to be used for coding the target block. In this case, whether the motion vector of the block B is usable as a motion vector of the target block is first examined. There are cases where the motion vector detected from the block B is selected as a motion vector to be used for coding the block B, and a case where the motion vector of a block adjoining the block B (block A, X, or Y) is selected as the motion vector to be used for coding the block B.

The following describes a case where the motion vector detected from the block B is selected for coding of the block B. In this case, the decimal precision motion vector of the block B is detected during the time period t3, and the detected decimal precision motion vector will be used for coding the block B. More specifically, at the timing of the first step processing for the block C (time period t3), the decimal precision motion vector of the block B has not been detected, and the selection unit 105 cannot select the motion vector of the block B as a motion vector to be used for coding the block C. In this case, the selection unit 105 does not determine that the motion vector to be used for coding the left adjoining block has been detected (NO in step S303), and the processing proceeds to step S305. More specifically, the selection unit 105 does not select the motion vector of the block B as the left adjoining block but selects another adjoining block as a process target. Thus, the block X, Y, or Z is selected as a process target.

Then, the selection unit 105 examines whether the motion vector of the process target adjoining block is selectable as a motion vector to be used for coding the target block, by using the selection condition. At the time of this processing (time period t3), the decimal precision motion vectors to be used for coding the blocks X, Y, and Z have been detected. Therefore, the selection unit 105 calculates the difference values by using the decimal precision motion vector of these adjoining blocks and the integral precision motion vector of the target block and determines whether any adjoining block satisfies the selection condition.

The following describes a case where a block adjoining the block B is selected for coding of the block B. In this case, during the time period t3, the motion vector to be used for coding the block B has already been detected. For example, the motion vector of the block A is selected as a motion vector to be used for coding the block B. The decimal precision motion vector of the block A has been detected during the time period t2. Likewise, the decimal precision motion vector of an adjoining block selected for block B has been detected during the time period t3. Therefore, in this case, the selection unit 105 selects, in step S304, the motion vector to be used for coding the left adjoining block as a motion vector to be used for coding the target block. In this case, the processing for detecting the decimal precision motion vector of the target block will be omitted.

As described above, the coding apparatus 100 according to the present exemplary embodiment can perform suitable coding at a low calculation cost. The coding apparatus 100 uses the integral precision motion vector in calculation of the difference value from the left adjoining block from which the coding process has been started immediately before the target block. This allows the coding apparatus 100 to determine whether to use the motion vector of this block even when the decimal precision motion vector has not been detected for the block from which the coding process has been started immediately before the target block. More specifically, even with a flat image having a high noise condition, the coding apparatus 100 can improve the coding efficiency by replacing the motion vector of the target block with the motion vector of an adjoining block. In coding methods such as H.26x, MPEG, and HEVC, the difference between the motion vector of the target block and the motion vector of an adjoining block is coded. Therefore, the amount of code can be reduced by replacing the motion vector of the target block with the motion vector of the adjoining block.

The following describes a modification of the first exemplary embodiment. The coding apparatus 100 according to the present exemplary embodiment determines whether the motion vector of the left adjoining block out of blocks adjoining the target block and having the coding process completed is preferentially usable as a motion vector of the target block. This is because the coding cost can be most reduced when the motion vector of the left adjoining block is to be used. However, a block to be preferentially selected as a determination target needs to be a block adjoining the target block and having the coding process completed but is not limited to the left adjoining block.

The following describes points in which the coding apparatus 100 according to the second exemplary embodiment differs from the coding apparatus 100 according to the first exemplary embodiment. The coding apparatus 100 according to the second exemplary embodiment calculates the difference value between the target block and each of a plurality of blocks adjoining the target block and having the coding process completed.

Figure 6:
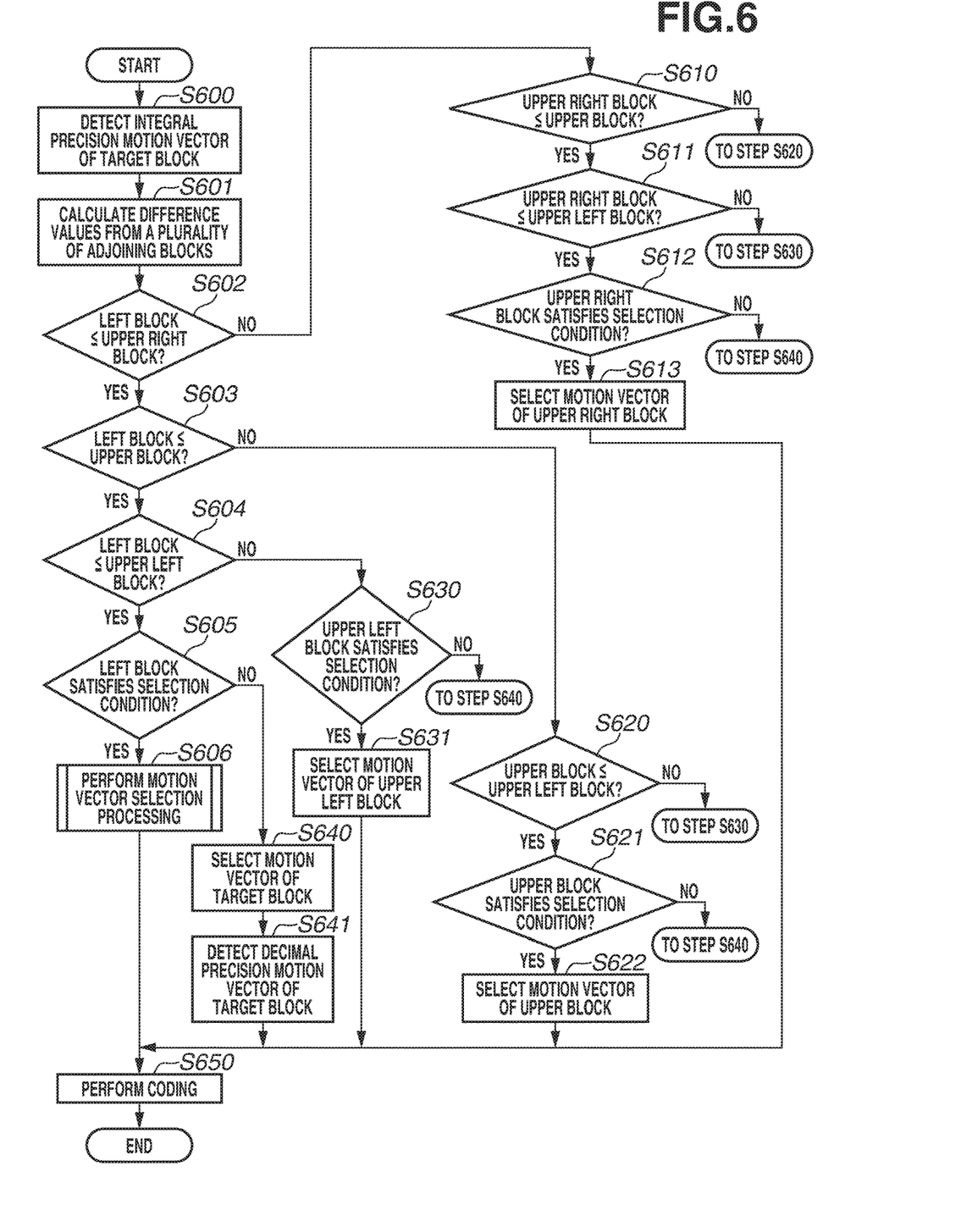
FIG. 6 is a flowchart illustrating another coding process.

FIG. 6 is a flowchart illustrating a coding process by the coding apparatus 100 according to the second exemplary embodiment. In step S600, the integral precision motion detection unit 101 detects the integral precision motion vector of the target block. The processing is similar to the processing in step S300 which has been described above with reference to FIG. 3. In step S601, the difference value calculation unit 103 identifies a plurality of blocks adjoining the target block and having the coding process completed. The left, upper left, upper, and upper right blocks adjoining the target block are identified as blocks adjoining the target block and having the coding process completed. Hereinafter, the left, upper left, upper, and upper right blocks adjoining the target block are referred to as the left, upper left, upper, and upper right blocks, respectively. For example, when the block C in FIG. 4 is a process target, the block B is identified as the left block, the block X is identified as the upper left block, the block Y is identified as the upper block, and the block Z is identified as the upper right block.

The difference value calculation unit 103 calculates the motion vector difference value and the pixel difference value for a pair of each adjoining block and the target block. For the left block out of the adjoining blocks, only the integral precision motion vector has been already detected at the time of the processing in step S601. Therefore, for a pair of the integral precision motion vector of the left block and the target block, the difference value calculation unit 103 calculates the difference value by using the integral precision motion vectors of both blocks. On the other hand, for adjoining blocks other than the left block (the upper left, upper, and right blocks), the decimal precision motion vector has been already detected at the time of the processing in step S601, and thus, the decimal precision motion vector is used as the motion vector for each adjoining block. More specifically, for the adjoining blocks other than the left block, the difference value calculation unit 103 calculates the difference value between the decimal precision motion vector of each adjoining block and the integral precision motion vector of the target block. The difference value calculation unit 103 further identifies a reference block by applying the decimal precision motion vector of each adjoining block to the target block and calculates the pixel difference value between the reference block and the target block.

In the processing in step S602 and subsequent steps, the selection unit 105 selects the motion vector to be used for coding the target block based on the calculation result for each adjoining block. In step S602, the selection unit 105 selects the left and upper right blocks as comparison targets. Then, the selection unit 105 determines whether a condition that the motion vector difference value of the left block is equal to or less than that of the upper right block and the pixel difference value of the left block is equal to or less than that of the upper right block is satisfied. For convenience of explanation, the condition is referred to as "Left Block≤Upper Right Block". When the condition "Left Block≤Upper Right Block" is satisfied (YES in step S602), the processing proceeds to step S603. On the other hand, when the condition "Left Block≤Upper Right Block" is not satisfied (NO in step S602), the processing proceeds to step S610.

In step S603, the selection unit 105 selects the left and upper blocks as comparison targets. Then, the selection unit 105 determines whether a condition that the motion vector difference value of the left block is equal to or less than that of the upper block and the pixel difference value of the left block is equal to or less than that of the upper block is satisfied. For convenience of explanation, the condition is referred to as "Left Block≤Upper Block". When the condition "Left Block≤Upper Block" is satisfied (YES in step S603), the processing proceeds to step S604. On the other hand, when the condition "Left Block≤Upper Block" is not satisfied (NO in step S603), the processing proceeds to step S620.

In step S604, the selection unit 105 selects the left and upper left blocks as comparison targets. Then, the selection unit 105 determines whether a condition that the motion vector difference value of the left block is equal to or less than that of the upper left block and the pixel difference value of the left block is equal to or less than that of the upper left block is satisfied. For convenience of explanation, the condition is referred to as "Left Block≤Upper Left Block". When the condition "Left Block≤Upper Left Block" is satisfied (YES in step S604), the processing proceeds to step S605. On the other hand, when the condition "Left Block≤Upper Left Block" is not satisfied (NO in step S604), the processing proceeds to step S630.

In step S605, the selection unit 105 determines whether the left block satisfies the selection condition. The processing is similar to the processing in step S302 described above with reference to FIG. 3. More specifically, when the motion vector difference value calculated for the left block is less than a motion vector threshold value and the pixel difference value calculated therefor is less than a pixel threshold value, the selection unit 105 determines that the selection condition is satisfied.

When the left block satisfies the selection condition (YES in step S605), the processing proceeds to step S606. On the other hand, when the left block does not satisfy the selection condition (NO in step S605), the processing proceeds to step S640. The processing in step S606 is similar to the processing in step S304 and the subsequent steps described above with reference to FIG. 3. More specifically, in the processing in step S606, the motion vector of the left block, an adjoining block other than the left block, or the target block is selected. After the selection unit 105 completes the processing in step S606, the processing proceeds to step S650.

In step S610, the selection unit 105 selects the upper right and upper blocks as comparison targets. Then, the selection unit 105 determines whether a condition that the motion vector difference value of the upper right block is equal to or less than that of the upper block and the pixel difference value of the upper right block is equal to or less than that of the upper block is satisfied. For convenience of explanation, the condition is referred to as "Upper Right Block≤Upper Block". When the condition "Upper Right Block≤Upper Block" is satisfied (YES in step S610), the processing proceeds to step S611. On the other hand, when the condition "Upper Right Block≤Upper Block" is not satisfied (NO in step S610), the processing proceeds to step S620.

In step S611, the selection unit 105 selects the upper right and upper left blocks as comparison targets. Then, the selection unit 105 determines whether a condition that the motion vector difference value of the upper right block is equal to or less than that of the upper left block and the pixel difference value of the upper right block is equal to or less than that of the upper left block is satisfied. For convenience of explanation, the condition is referred to as "Upper Right Block≤Upper Left Block". When the condition "Upper Right Block≤Upper Left Block" is satisfied (YES in step S611), the processing proceeds to step S612. On the other hand, when the condition "Upper Right Block≤Upper Left Block" is not satisfied (NO in step S611), the processing proceeds to step S630.

In step S612, the selection unit 105 determines whether the upper right block satisfies the selection condition. The processing is similar to the processing in step S302 (FIG. 3). More specifically, when the motion vector difference value calculated for the upper right block is less than a vector threshold value and the pixel difference value calculated therefor is less than a pixel threshold value, the selection unit 105 determines that the selection condition is satisfied. When the upper right block satisfies the selection condition (YES in step S612), the processing proceeds to step S613. On the other hand, when the upper right block does not satisfy the selection condition (NO in step S612), the processing proceeds to step S640. In step S613, the selection unit 105 selects the motion vector to be used for coding the upper right block as a motion vector to be used for coding the target block. Then, the processing proceeds to step S650.

In step S620, the selection unit 105 selects the upper and upper left blocks as comparison targets. Then, the selection unit 105 determines whether a condition that the motion vector difference value of the upper block is equal to or less than that of the upper left block and the pixel difference value of the upper block is equal to or less than that of the upper left block is satisfied. For convenience of explanation, the condition is referred to as "Upper Block≤Upper Right Block". When the condition "Upper Block≤Upper Left Block" is satisfied (YES in step S620), the processing proceeds to step S621. On the other hand, when the condition "Upper Block≤Upper Left Block" is not satisfied (NO in step S620), the processing proceeds to step S630.

In step S621, the selection unit 105 determines whether the upper block satisfies the selection condition. The processing is similar to the processing in step S613. When the upper block satisfies the selection condition (YES in step S621), the processing proceeds to step S622. On the other hand, when the upper block does not satisfy the selection condition (NO in step S621), the processing proceeds to step S640. In step S622, the selection unit 105 selects the motion vector to be used for coding the upper block as a motion vector to be used for coding the target block. Then, the processing proceeds to step S650.

In step S630, the selection unit 105 determines whether the upper left block satisfies the selection condition. The processing is similar to the processing in step S613. When the upper left block satisfies the selection condition (YES in step S630), the processing proceeds to step S631. On the other hand, when the upper left block does not satisfy the selection condition (NO in step S630), the processing proceeds to step S640. In step S631, the selection unit 105 selects the motion vector to be used for coding the upper left block as a motion vector to be used for coding the target block. Then, the processing proceeds to step S650.

In step S640, the selection unit 105 selects the decimal precision motion vector detected from the target block as a motion vector to be used for coding the target block. In step S641, the decimal precision motion detection unit 106 detects the decimal precision motion vector of the target block. Then, the processing proceeds to step S650. In step S650, the coding unit 107 performs coding of the target block by using the motion vector selected for the target block. The processing in step S650 is similar to the processing in step S309 described above with reference to FIG. 3. This completes the coding process by the coding apparatus 100 according to the second exemplary embodiment. Other components and processing of the coding apparatus 100 according to the second exemplary embodiment are similar to the components and processing of the coding apparatus 100 according to the first exemplary embodiment.

As described above, the coding apparatus 100 according to the second exemplary embodiment calculates the motion vector difference value and the pixel difference value for each of a plurality of adjoining blocks and selects one of the adjoining blocks based on the calculation result. Then, according to the selection condition, the coding apparatus 100 determines whether the motion vector to be used for coding the selected adjoining block is selectable as a motion vector to be used for coding the target block. This allows the coding apparatus 100 to perform suitable coding at a low calculation cost. The processing for selecting one adjoining block is an example of block selection processing.

When the motion vector difference value and the pixel difference value are equal for all of the adjoining blocks adjoining the target block and the selection condition is satisfied, the coding apparatus 100 according to the second exemplary embodiment will preferentially select the motion vector of the left block. The above-described processing is intended to cope with the fact that an index representing the block to the left of the target block has a smaller amount of code than an index representing each of the other adjoining blocks, in HEVC. More specifically, the amount of code can be reduced by preferentially selecting the motion vector of the left block.

The following describes a modification of the second exemplary embodiment. In the coding apparatus 100 according to the present exemplary embodiment, priority is set for the target block, and the left, upper right, upper, and upper left blocks are preferentially selected in this order, i.e., in order of priority. However, the coding apparatus 100 can arbitrarily set which one of a plurality of adjoining blocks is to be preferentially selected. For example, the coding apparatus 100 may set priority such that the left, upper left, upper, and upper right blocks are selected in this order. As another example, the coding apparatus 100 may set priority such that the upper right, upper, upper left, and left blocks are selected in this order. In the coding apparatus 100, setting higher priority to adjoining blocks other than the left block in this way makes it possible to preferentially select adjoining blocks with which the decimal precision motion vector has been detected.

Figure 7:
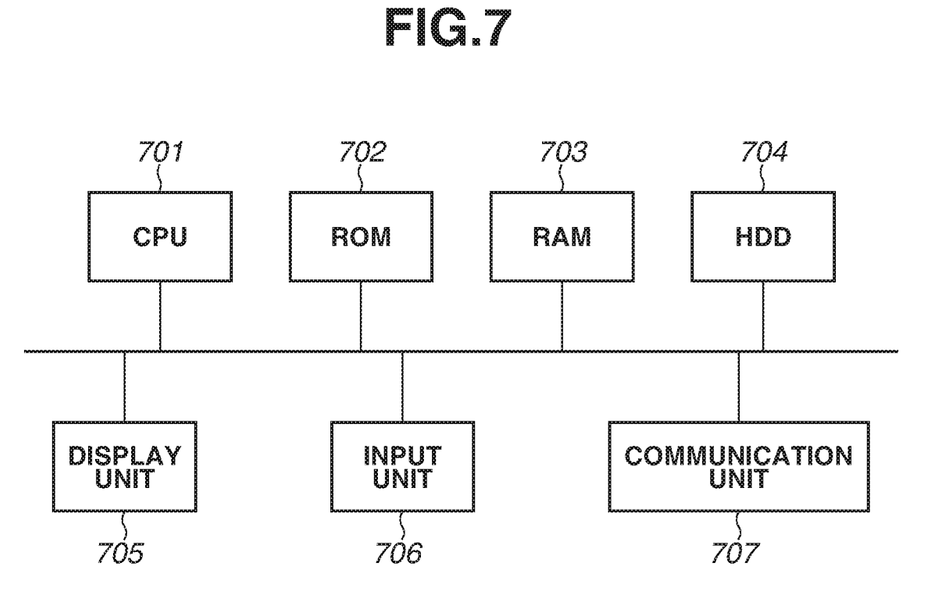
FIG. 7 illustrates a coding apparatus according to a modification.

Instead of hardware-based implementation of the components of the coding apparatus 100 described above with reference to FIG. 2, a modification of an exemplary embodiment may be implemented by a configuration in which a central processing unit (CPU) reads a program stored in a read only memory (ROM) or a hard disk drive (HDD) and then executes the program. FIG. 7 illustrates a hardware configuration of the coding apparatus 100 in this case. The coding apparatus 100 includes a CPU 701, a ROM 702, a random access memory (RAM) 703, an HDD 704, a display unit 705, an input unit 706, and a communication unit 707. The CPU 701 reads a control program stored in the ROM 702 and executes various kinds of processing. The RAM 703 is used as the main memory of the CPU 701 and a temporary storage area such as a work area. The HDD 704 stores various kinds of data and various programs. The display unit 705 displays various information. The input unit 706 is provided with a keyboard and a mouse for receiving various user operations. The communication unit 707 performs processing for communicating with an external apparatus via a network.

As another example, the CPU 701 may read a program stored in a recording medium such as a secure digital (SD) card instead of the ROM 702. As another example, at least a part of functions and processing of the coding apparatus 100 may be implemented through a collaboration of a plurality of CPUs, a RAM, a ROM, and a storage.

While the present invention has specifically been described in detail above based on exemplary embodiments, the present invention is not limited thereto but can be modified in diverse ways within the ambit of the appended claims.

According to the above-described exemplary embodiments, it is possible to perform suitable coding at a lower calculation cost.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-182454, filed Sep. 22, 2017, which is hereby incorporated by reference herein in its entirety.

What is claimed is:

1. A coding apparatus for coding a frame of a moving image on a block basis, the coding apparatus comprising a computer executing instructions that, when executed by the computer, cause the computer to function as:
   a detection unit configured to perform motion detection for a block included in the frame;
   a calculation unit configured to calculate a difference value between a motion vector detected by the motion detection for a target block and a candidate of a motion vector of the target block, and calculate a difference value between pixels of a reference block identified by the candidate of the motion vector and pixels of the target block, wherein the candidate can be a motion vector of a first adjoining block which is processed immediately before the target block, the motion vector of the target block is used for coding the target block, and the motion vector of the first adjoining block is used for coding the first adjoining block;
   a determination unit configured to determine whether the motion detection for the first adjoining block has been completed at time for selecting the motion vector of the target block; and
   a motion vector selection unit configured to, based on a calculation result by the calculation unit and a determination result by the determination unit, select the motion vector of the target block from among the candidate and the motion vector detected from by the motion detection for the target block,
   wherein, in a case where the motion detection for the first adjoining block has not been completed at the time for selecting the motion vector of the target block, the motion vector selection unit does not select the motion vector of the first adjoining block as the motion vector of the target block.

2. The coding apparatus according to claim 1, wherein the motion vector selection unit does not select, as the motion vector of the target block, a motion vector of the first adjoining block with which the motion vector difference value is equal to or larger than a threshold value or the pixel difference value is equal to or larger than a threshold value.

3. The coding apparatus according to claim 1,
   wherein the detection unit detects a first motion vector of the target block and, when the motion vector detected from the target block is selected as the motion vector of the target block, detects a second motion vector having a higher precision than the first motion vector; and
   wherein the instructions further cause the computer to function as an encoding unit configured to, when the motion vector detected from the target block is selected as a motion vector of the target block, perform coding by using the second motion vector detected from the target block.

4. The coding apparatus according to claim 1, the instructions further cause the computer to function as a control unit configured to perform control to sequentially select each of a plurality of blocks included in the frame as a target.

5. The coding apparatus according to claim 4,
   wherein, when the calculation result by the calculation unit for the first adjoining block satisfies a preset selection condition and the motion vector of the first adjoining block has been detected, the motion vector selection unit selects the motion vector of the first adjoining block as the motion vector of the target block.

6. The coding apparatus according to claim 5, wherein, in a case where the motion vector of the first adjoining block is not selected as the motion vector of the target block, the motion vector selection unit determines whether to use a motion vector of a second adjoining block adjoining the target block as the motion vector of the target block, based on the motion vector of the second adjoining block other than the first adjoining block out of the plurality of adjoining blocks.

7. The coding apparatus according to claim 6, wherein, when the motion vector of the adjoining block is not selected as the motion vector of the target block, for the plurality of adjoining blocks, the motion vector selection unit selects the motion vector detected from the target block as the motion vector of the target block.

8. The coding apparatus according to claim 4,
   wherein the detection unit detects a first motion vector of the target block and, when the motion vector detected from the target block is selected as the motion vector of the target block, detects a second motion vector having a higher precision than the first motion vector;
   wherein the instructions further cause the computer to function as an encoding unit configured to, when the motion vector detected from the target block is selected as the motion vector of the target block, perform coding by using the second motion vector detected from the target block; and
   wherein the calculation unit calculates the motion vector difference value and the pixel difference value by using the first motion vector of the target block and the first motion vector of the first adjoining block.

9. The coding apparatus according to claim 1,
   wherein the calculation unit calculates the motion vector difference value and the pixel difference value for each of a plurality of adjoining blocks;
   wherein the instructions further cause the computer to function as a block selection unit configured to select one adjoining block from among the plurality of adjoining blocks based on the motion vector difference value and the pixel difference value; and
   wherein, based on the calculation result and the determination result for the adjoining block selected by the block selection unit, the motion vector selection unit determines whether to select the selected adjoining block as the motion vector of the target block.

10. The coding apparatus according to claim 9, wherein the block selection unit selects the one adjoining block according to priority preset for a plurality of adjoining blocks.

11. The coding apparatus according to claim 9, wherein, when the motion vector selection unit determines not to select the motion vector of the adjoining block selected by the block selection unit as the motion vector of the target block, the motion vector selection unit selects the motion vector detected from the target block as the motion vector of the target block.

12. A coding method by a coding apparatus for coding a frame of a moving image on a block basis, the coding method comprising:
    performing motion detection for a block included in the frame;
    calculating a difference value between a motion vector detected by the motion detection for a target block and a candidate of a motion vector of the target block, and calculating a difference value between pixels of a reference block identified by the candidate of the motion vector and pixels of the target block, wherein the candidate can be a motion vector of a first adjoining block which is processed immediately before the target block, the motion vector of the target block is used for coding the target block, and the motion vector of the first adjoining block is used for coding the first adjoining block;

determining whether the motion detection for the first adjoining block has been completed at time for selecting the motion vector of the target block; and selecting, based on a calculation result by the calculating and a determination result by the determining, the motion vector of the target block from among the candidate and the motion vector detected by the motion detection for the target block, wherein, in a case where the motion detection for the first adjoining block has not been completed at the time for selecting the motion vector of the target block, the motion vector of the first adjoining block is not selected as the motion vector of the target block.

13. A non-transitory computer-readable recording medium storing a program for causing a computer of a coding apparatus for coding a frame of a moving image on a block basis to function as:

a detection unit configured to perform motion detection for a block included in the frame;

a calculation unit configured to calculate a difference value between a motion vector detected by the motion detection for a target block and a candidate of a motion vector of the target block, and calculate a difference value between pixels of a reference block identified by the candidate of the motion vector and pixels of the target block, wherein the candidate can be a motion vector of a first adjoining block which is processed immediately before the target block, the motion vector of the target block is used for coding the target block, and the motion vector of the first adjoining block is used for coding the first adjoining block;

a determination unit configured to determine whether the motion detection for the first adjoining block has been completed at the time for selecting the motion vector of the target block; and a motion vector selection unit configured to, based on a calculation result by the calculation unit and a determination result by the determination unit, select the motion vector of the target block from among the candidate and the motion vector detected from by the motion detection for the target block, wherein, in a case where the motion detection for the first adjoining block has not been completed at the time for selecting the motion vector of the target block, the motion vector selection unit does not select the motion vector of the first adjoining block as the motion vector of the target block.

* * * * *